United States Patent [19]

Robinson et al.

[11] 3,760,102

[45] Sept. 18, 1973

[54] LEVEL SETTING IN NOISE REDUCTION SYSTEMS

[75] Inventors: David Peter Robinson; Ray Milton Dolby, both of London, S.W.9, England

[73] Assignee: Dolby Laboratories Inc., New York, N.Y.

[22] Filed: Oct. 26, 1971

[21] Appl. No.: 192,375

[52] U.S. Cl. ............. 179/1 R, 179/100.2 K, 333/14

[51] Int. Cl. ............................................... H03g 7/00

[58] Field of Search ................. 179/1 D, 1 G, 1 SW, 179/100.2 S, 100.2 K, 5 P, 1 R; 333/14, 17 R, 28 T

[56] References Cited

UNITED STATES PATENTS

| | | | |
|---|---|---|---|
| 3,657,489 | 4/1972 | Clark | 333/14 |
| 3,366,961 | 1/1968 | Goldstein | 343/225 |
| 3,008,011 | 11/1961 | Fine | 179/1 G |
| 2,279,018 | 4/1942 | Wolfe | 179/100.2 S |
| 3,067,292 | 12/1962 | Minter | 179/1 G |
| 3,067,297 | 12/1962 | Fink | 179/1 G |

*Primary Examiner*—Kathleen H. Claffy
*Assistant Examiner*—Jon Bradford Leaheey
*Attorney*—Sewall P. Bronstein et al.

[57] ABSTRACT

A special test tone at a predetermined level is recorded or transmitted to enable the level to be set correctly on playback or reception. To enable the tone to be identified, it is intermittently and briefly frequency modulated to give the aural impression of a constant tone with intermittent "blips" therein. Because the amplitude stays constant, the modulation does not interfere with level meters and the like.

13 Claims, 1 Drawing Figure

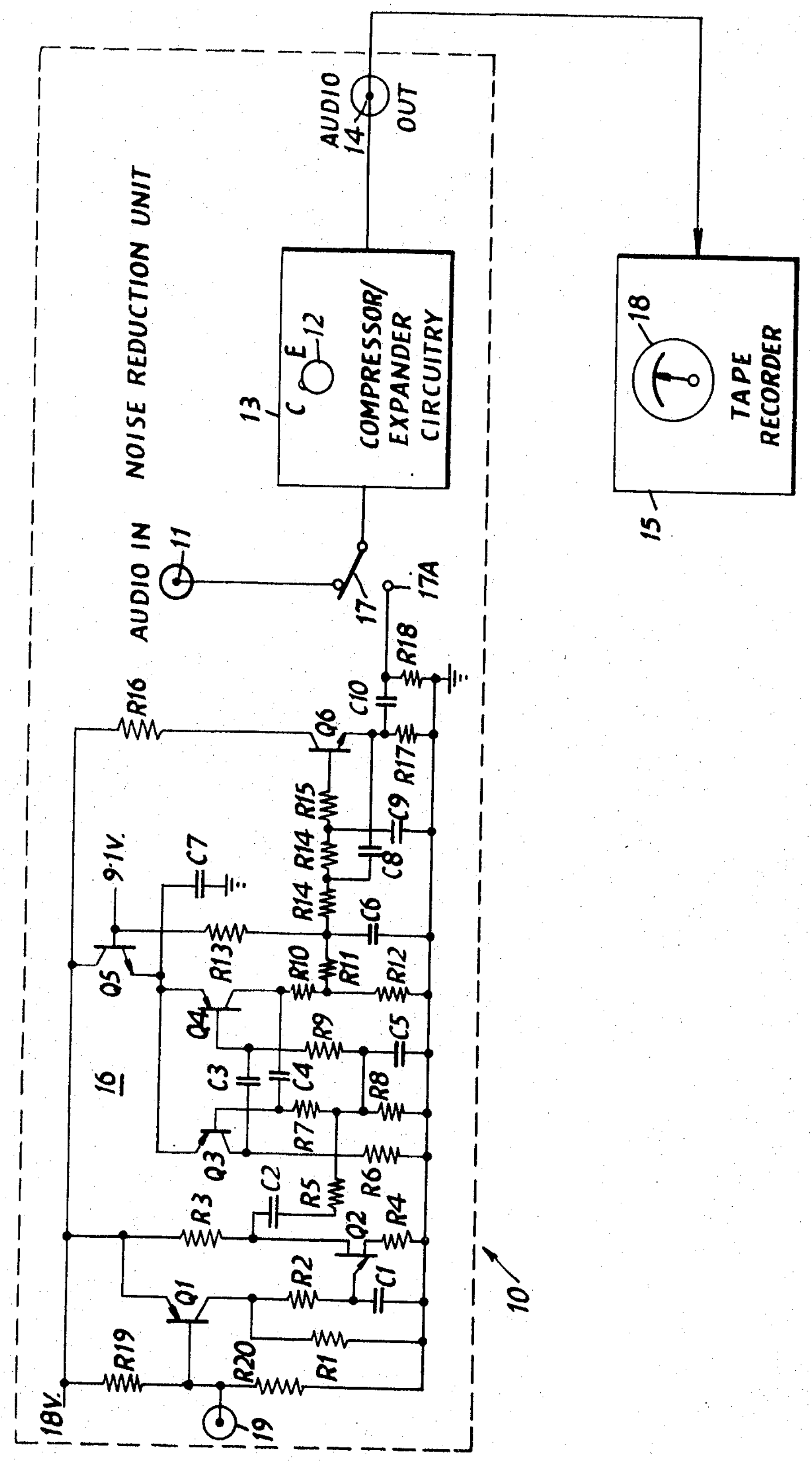
NOISE REDUCTION UNIT
AUDIO IN
11
AUDIO 14 OUT
13
C E 12
COMPRESSOR/ EXPANDER CIRCUITRY
TAPE RECORDER
18
15
17
17A
16
10
18V.
19
9·1V.
Q1 Q2 Q3 Q4 Q5 Q6
R1 R2 R3 R4 R5 R6 R7 R8 R9 R10 R11 R12 R13 R14 R14 R15 R16 R17 R18 R19 R20
C1 C2 C3 C4 C5 C6 C7 C8 C9 C10

LEVEL SETTING IN NOISE REDUCTION SYSTEMS

All noise reduction or compander systems have nonlinear transfer characteristics in both the encode or compressor mode and the decode or expander mode. Correct operation of the expander depends on matching its transfer function exactly to that of the compressor. This is most readily achieved by the use of a test tone having a predetermined level. The tone can be used in particular to check that the recording or transmission is effected at the correct level and that the expander is correctly set in relation to this level.

However, a multiplicity of tones at different frequencies are currently used in audio studios for various equalization and test purposes and it is difficult for the monitoring engineer to be sure that he is listening to and setting a level correctly in relation to the right tone.

The present invention overcomes this problem by using an audio tone whose amplitude or level is strictly constant but whose frequency is intermittently and briefly modulated to give the aural effect of a chirp or blip on the tone. Since the amplitude is not changed, whatever instruments are used for level setting purposes are not upset by the modulation irrespective of their time constant. The tone is nevertheless highly characteristic aurally and by using different base frequencies, and periods and mark-space ratios of the intermittent modulation, a plurality of readily distinguishable tones can be set up.

Extensive experiments have led to the following general conclusions:

1. The frequency modulation is preferably of the order of 10 percent of the frequency of the base tone.
2. The frequency modulation is preferably effected in a stepwise manner.
3. The best aural effect is obtained by modulating the frequency upwardly, not downwardly.
4. The period of the intermittent modulation is preferably in the range 0.5 to 1.5 seconds.
5. If the duration of each interval of modulation is restricted to the low tens of milliseconds, the ear does not detect a change in frequency; the effect is of a blip in the amplitude even although this is, in fact, constant.
6. For "professional" work the base tone is preferably in the high hundreds of Hz. We prefer to use a frequency of 850 Hz which is halfway between the NAB 1,000 Hz standard and the DIN 700 Hz standard applicable to tape recording. For consumer applications such as tape recorders with low tape speeds, a lower base frequency, e.g. 400 Hz modulated up to 440 Hz seems to be preferable.

The invention is intended particularly for use with Dolby Noise Reduction Systems as available commercially from Dolby Laboratories Inc. or as embodied under licence in professional and consumer tape recorders made by various manufacturers throughout the world. Details of such noise reduction systems are to be found in the following U.S. Pat. applications to Ray M. Dolby: Ser. No. 880,481 (Continuation of U.S. Pat. Ser. No. 569,615); U.S. Pat. Ser. No. 789,703 all now abandoned and U.S. Pat. Ser. No. 867,454 now U.S. Pat. No. 3,631,365.

It will be appreciated however that the invention has general aPplicability in audio recording and transmission.

One embodiment of the invention will now be described, as applied to the Dolby 360 Series noise reduction units available from Dolby Laboratories Inc. The embodiment is illustrated in the sole FIGURE of the accompanying drawing which is partially in block form but shows the actual circuit of the tone generator.

The Dolby 360 Series unit 10 has an input terminal 11 for reception of the input audio material. A switch 12 sets the compressor/expander circuitry 13 of the unit to compressor or expander mode and it is assumed that the unit is in compressor mode and that the output terminal 14 at which the compressed signal appears is connected to a studio tape recorder 15.

The unit 10 includes a tone generator 16 generating the constant amplitude, frequency-modulated test tone. A switch 17 connects the output 17A of the oscillator the circuitry 13 in place of the input terminal 11 when it is desired to record the test zone.

The tone generator 16 generates a signal at 850 Hz which is modulated to approximately 930 Hz for 30 mS every 750 mS. The 850 Hz oscillator consists of a conventional free-running multivibrator formed by Q3 and Q4 cross-coupled by C3 and C4. It is easy with this type of oscillator to obtain a constant, predetermined amplitude which is independent of frequency. R12 may be trimmed to achieve the exact level required which we prefer to make equivalent to the NAB standard of 185 Nano Webers/metre since this level can also be read on a DIN level meter (the standard DIN level being 320 nano Webers/metre). R8 can be trimmed to adjust the oscillator frequency to 850 Hz.

The square wave oscillator output is converted to a sinusoid by Q6 and the associated base circuit components. The sinusoidal output signal appears at terminal 17A of switch 17.

A modulating square wave of period 750 mS and "on" duration 30 mS is generated by a unijunction transistor Q2, resistor R2 and capacitor C1 and applied to the timing resistors R7 and R9 of the oscillator to pull the frequency up to approximately 930 Hz. R2 may be trimmed to adjust the period.

Suitable component values are as follows:

| | | | | |
|---|---|---|---|---|
| Transistor types | | | | |
| | Q1 | 2N4058 | Q5 | BC168 |
| | Q2 | 2N4870 | Q6 | BC169 |
| | Q3, Q4 | 2N4058 | | |
| Resistors, in ohms | | | | |
| | R1 | 330K | R10 | 2.7K |
| | R2 | 15K | R11 | 13K |
| | R3 | 100 | R12 | 330 |
| | R4 | 56 | R13 | 22K |
| | R5 | 6.8K | R14 | 13K |
| | R6 | 3.3K | R15 | 13K |
| | R7 | 68K | R16 | 6.8K |
| | R8 | 12K | R17 | 680 |
| | R9 | 75K | R18 | 10K |
| Capacitors, in μF | | | | |
| | C1 | 33/6 | C6 | 0.022 |
| | C2 | 1/20 | C7 | 10/16 |
| | C3 | 0.01 | C8 | 0.1 |
| | C4 | 0.01 | C9 | 1200 pF |
| | C5 | 2.2/16 | C10 | 10/16 |

In use, the recording engineer operates the switch 17 to terminal 17A to switch in the test tone and adjusts the record gain of the tape recorder 15 to obtain the correct reading on the level meter 18 of the recorder; a suitable length of the tape now has the test tone recorded thereon at the correct level. This tone is now always available on the tape for subsequent level-checking purposes and can always be unambiguously identified by its characteristic "blip."

When the switch 17 is in the position shown, i.e., when the test tone is not required, it can be arranged (by a ganged switch, not shown) to switch off the generator 16 by applying a signal to the base of Q1 to turn off Q1 and further by clamping off the oscillator Q3, Q4. Thus the base of Q1 is normally biased by resistors R19 and R20 to keep Q1 conducting but a negative signal applied to terminal 19 will turn Q1 off. The terminal 19 can also be used independently to remove the modulation for special reasons, leaving the oscillator functioning otherwise normally.

What is claimed is:

1. In an audio system having an input, a test tone generator, and switching means for selectively connecting the input to receive an audio input signal or the output of said generator, the improvement wherein said generator comprises:

a constant amplitude audio oscillator having a base frequency of some hundreds of Hertz, and modulating means permanently connected to the oscillator for intermittently and briefly frequency-modulating the oscillator without changing the amplitude of the signal generated thereby, wherein said modulating means shift the oscillator frequency from the base frequency to a different frequency during first intervals of low tens of milliseconds in duration, the intervening intervals during which the oscillator is at the base frequency being substantially longer than the first intervals.

2. A noise reduction unit comprising compressor/expander circuitry having an input and an output, a switch for setting said circuitry selectively to compressor mode or expander mode, a signal input terminal, a test tone generator having an output terminal, and switching means for selectively connecting said input terminal or said generator output terminal to said circuitry input, said generator comprising:

a constant amplitude audio oscillator, and modulating means for intermittently and briefly frequency-modulating the oscillator without changing the amplitude of the signal generated thereby.

3. A system according to claim 2, wherein said modulating means change the oscillator frequency by an amount of the order of 10 percent.

4. A system according to claim 3, wherein said modulating means shift the oscillator frequency upwardly.

5. A system according to claim 3, wherein said modulating means modulate the oscillator frequency abruptly between two frequencies differing by approximately 10 percent.

6. A system according to claim 2, wherein the modulating means have a period in the range 0.5 to 1.5 seconds.

7. A system according to claim 2, wherein the oscillator comprises a constant-amplitude, free-running multivibrator generating square waves, and a shaping circuit for forming a sinusoidal signal from the square waves.

8. A noise reduction unit according to claim 2, wherein said modulating means shift the oscillator frequency from a base frequency to a different frequency during first intervals of low tens of milliseconds in duration, the intervening intervals during which the oscillator is at the base frequency being substantially longer than the first intervals.

9. A noise reduction unit according to claim 8, wherein the base frequency is some hundreds of Hz and the different frequency is approximately 10 percent higher than the base frequency.

10. A system according to claim 9, wherein the base frequency is approximately 850 Hz.

11. A system according to claim 9, wherein the base frequency is approximately 400 Hz.

12. A noise reduction unit according to claim 14, wherein the modulating means is permanently connected to the oscillator.

13. A noise reduction unit comprising compressor/expander circuitry having an input and an output, a switch for setting said circuitry selectively to compressor mode or expander mode, a signal input terminal, a test tone generator having an output terminal, and switching means for selectively connecting said input terminal or said generator output terminal to said circuitry input, said generator comprising:

a constant amplitude audio oscillator having a base frequency greater than 500 Hz, and modulating means for intermittently and briefly frequency-modulating the oscillator without changing the amplitude of the signal generated thereby.

* * * * *

PO-1050
(5/69)

UNITED STATES PATENT OFFICE
CERTIFICATE OF CORRECTION

Patent No. 3,760,102 Dated September 18, 1973

Inventor(s) David Peter Robinson and Ray Milton Dolby

It is certified that error appears in the above-identified patent and that said Letters Patent are hereby corrected as shown below:

In the specification, page 3, cancel lines 23 and 24 and substitute:

--Serial No. 397,159 (Continuation of Serial No. 173,261, Serial No. 880,481 and Serial No. 569,615, all now abandoned in favor of Serial No. 397,159);
Serial No. 395,562 (Continuation of Serial No. 227,144 and Serial No. 789,703, both now abandoned in favor or Serial No. 395,562); and
Serial No. 867,454, now Patent No. 3,631,365.--

Signed and sealed this 11th day of June 1974.

(SEAL)
Attest:

EDWARD M.FLETCHER,JR.
Attesting Officer

C. MARSHALL DANN
Commissioner of Patents